(12) United States Patent
Ernst

(10) Patent No.: US 8,197,169 B2
(45) Date of Patent: Jun. 12, 2012

(54) HOLLOW WALL FASTENER

(75) Inventor: Richard J. Ernst, San Diego, CA (US)

(73) Assignee: Illinois Tool Works Inc., Glenview, IL (US)

(*) Notice: Subject to any disclaimer, the term of this patent is extended or adjusted under 35 U.S.C. 154(b) by 108 days.

(21) Appl. No.: 12/874,678

(22) Filed: Sep. 2, 2010

(65) Prior Publication Data

US 2010/0329819 A1 Dec. 30, 2010

Related U.S. Application Data

(63) Continuation-in-part of application No. 12/393,592, filed on Feb. 26, 2009, now Pat. No. 7,850,408.

(60) Provisional application No. 61/033,115, filed on Mar. 3, 2008.

(51) Int. Cl.
*F16B 21/00* (2006.01)

(52) U.S. Cl. ............ 411/345; 411/80.1; 411/21

(58) Field of Classification Search .............. 411/344, 411/345, 349, 21, 48, 80.1, 28, 44
See application file for complete search history.

(56) References Cited

U.S. PATENT DOCUMENTS

| | | | |
|---|---|---|---|
| 492,418 A | 2/1893 | McClintock | |
| 638,384 A | 12/1899 | Dyer | |
| 868,353 A | 10/1907 | Martin, Jr. | |
| 974,391 A | 11/1910 | Jossart | |
| 977,795 A | 12/1910 | Gronke et al. | |
| RE13,204 E | 2/1911 | Jossart | |
| 1,051,893 A | 2/1913 | Joseph | |
| 1,236,293 A | 8/1917 | Grosser et al. | |
| 1,452,514 A | 4/1923 | Karitzky | |
| 2,266,892 A | 12/1941 | Mullen | |
| 2,377,086 A | 5/1945 | Lang | |
| 2,578,515 A | 12/1951 | Crafton | |
| 2,609,723 A | 9/1952 | Stubbs | |

(Continued)

FOREIGN PATENT DOCUMENTS

DE 509511 10/1930

(Continued)

OTHER PUBLICATIONS

International Search Opinion for PCT/US2009/036641.

(Continued)

*Primary Examiner* — Gary Estremsky
(74) *Attorney, Agent, or Firm* — Levenfeld Pearlstein, LLC

(57) ABSTRACT

An anchor system for a hollow wall or ceiling includes an anchor portion having a flange and a penetrating portion extending from a rear surface of the flange. The penetrating portion has a fixed sleeve extending from the rear surface of the flange and a pivoting locking leg connected to the fixed sleeve by a hinge. The fixed sleeve has a sleeve opening extending longitudinally therethrough and the pivoting locking leg has a stub extending from a rear surface thereof to retain the penetrating portion rigid as the anchor is inserted into the wall or ceiling. A pin portion has a body and includes a flexible shaft extending from the body. The pin portion has an actuating element extending transversely from the shaft. The pin portion further includes an opening in the body, spaced from the flexible shaft. Once the pin portion is in place in the anchor, a secondary locking pin is inserted through the pin portion body opening into the hollow wall or ceiling to prevent rotation of the pin portion relative to the anchor portion.

8 Claims, 5 Drawing Sheets

U.S. PATENT DOCUMENTS

| | | | |
|---|---|---|---|
| 2,916,235 A | 12/1959 | Wilhelm | |
| 3,188,905 A | 6/1965 | Millet | |
| 3,213,745 A | 10/1965 | Dwyer | |
| 3,272,061 A | 9/1966 | Clifford | |
| 3,406,431 A | 10/1968 | Lee | |
| 3,431,813 A | 3/1969 | Johnson | |
| 3,547,389 A | 12/1970 | Mitchell | |
| 3,550,499 A | 12/1970 | Ellenberger | |
| 3,897,035 A | 7/1975 | Solo et al. | |
| 3,964,364 A | 6/1976 | Poe | |
| 3,983,779 A | 10/1976 | Dimas | |
| 4,022,100 A | 5/1977 | Johnson | |
| 4,181,061 A | 1/1980 | McSherry | |
| 4,196,883 A | 4/1980 | Einhorn et al. | |
| 4,233,881 A | 11/1980 | Carrier | |
| 4,274,324 A | 6/1981 | Giannuzzi | |
| 4,289,062 A | 9/1981 | Schiefer | |
| 4,322,194 A | 3/1982 | Einhorn | |
| 4,500,238 A | 2/1985 | Vassiliou | |
| 4,601,625 A | 7/1986 | Ernst et al. | |
| 4,662,808 A | 5/1987 | Camilleri | |
| 4,669,936 A * | 6/1987 | Camilleri | 411/340 |
| 4,902,179 A | 2/1990 | Harker | |
| 4,989,817 A * | 2/1991 | Camilleri | 248/231.91 |
| 5,037,257 A | 8/1991 | Kubic et al. | |
| 5,221,167 A | 6/1993 | Girkin et al. | |
| 5,224,805 A | 7/1993 | Moretti et al. | |
| 5,409,336 A | 4/1995 | Jericevich et al. | |
| 5,417,531 A | 5/1995 | Brown | |
| 5,443,343 A | 8/1995 | Mutz et al. | |
| 5,447,005 A | 9/1995 | Giannuzzi | |
| 5,533,851 A | 7/1996 | Remmers | |
| 5,540,528 A | 7/1996 | Schmidt et al. | |
| 5,586,364 A | 12/1996 | Ferrari et al. | |
| 5,855,347 A * | 1/1999 | Hollingsworth et al. | 248/220.41 |
| 5,881,982 A * | 3/1999 | Hollingsworth et al. | 248/220.31 |
| RE36,622 E | 3/2000 | Harker | |
| 6,186,455 B1 * | 2/2001 | Hollingsworth et al. | 248/220.31 |
| 6,279,754 B1 | 8/2001 | Hoss | |
| 6,435,789 B2 | 8/2002 | Gaudron | |
| 6,494,653 B2 | 12/2002 | Remmers | |
| 6,641,107 B1 | 11/2003 | Janssen | |
| 6,676,349 B1 | 1/2004 | Mey | |
| 6,769,849 B2 | 8/2004 | Yoneoka | |
| 6,921,237 B2 | 7/2005 | Vassiliou | |
| 7,014,408 B2 | 3/2006 | OBanion et al. | |
| 7,118,315 B2 | 10/2006 | Huang | |
| 7,524,154 B2 * | 4/2009 | LaConte et al. | 411/551 |
| 7,850,408 B2 * | 12/2010 | Ernst et al. | 411/344 |
| 2005/0076602 A1 | 4/2005 | Routhier | |
| 2006/0222474 A1 | 10/2006 | Brown | |

FOREIGN PATENT DOCUMENTS

| | | |
|---|---|---|
| DE | 1813179 | 6/1970 |
| DE | 202005011883 U1 | 10/2005 |
| FR | 2282305 | 3/1976 |
| WO | WO 00/25031 | 5/2004 |
| WO | WO 2007005345 | 1/2007 |
| WO | WO 2008/103559 | 8/2008 |
| WO | WO 2009/111384 | 9/2009 |

OTHER PUBLICATIONS

International Search Report dated Jun. 26, 2009 for PCT/US2009/035680.
U.S. Appl. No. 11/678,459 (Non-published), filed Feb. 23, 2007.
Written Opinion of the International Searching Authority dated Jul. 17, 2008 for PCT/US06/24649.
Report of Novelty Search for wall anchor, dated Feb. 27, 2004.
"Toggler Anchor System Guide to Successful Anchoring." Mechanical Plastics Corp., 1997.
"E-Z Toggle Self-Drilling Drywall Toggle Bolts," Illinois Tool Works., 1995.

* cited by examiner

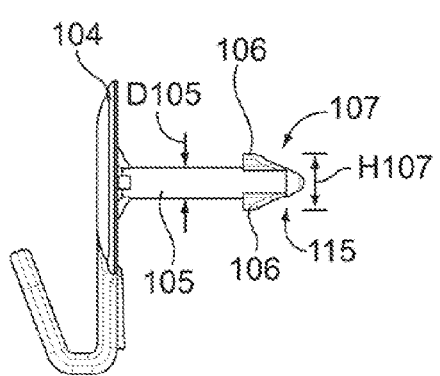
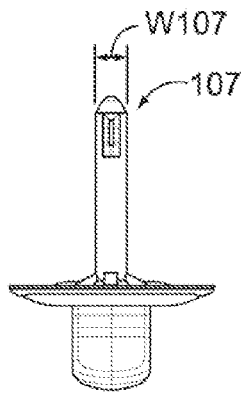
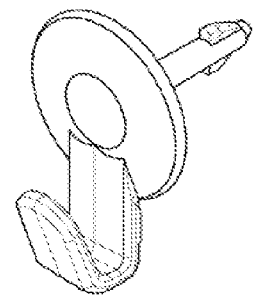
FIG. 1A
-- Prior Art --
FIG. 1B
-- Prior Art --
FIG. 1C
-- Prior Art --
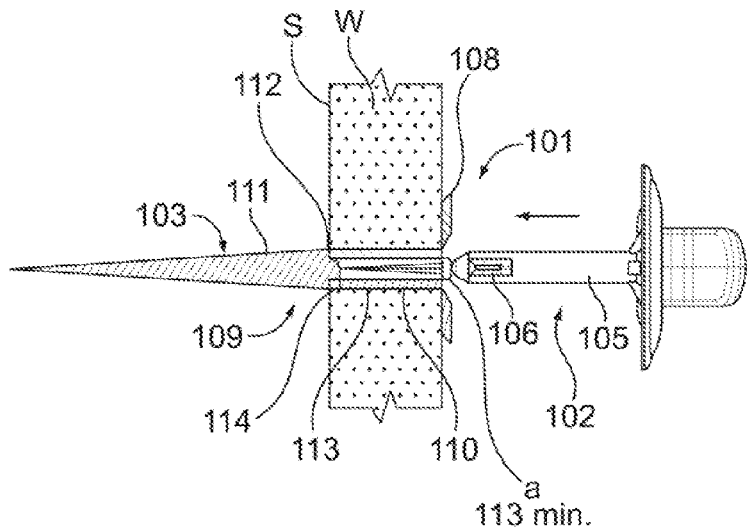
FIG. 2
-- Prior Art --

HOLLOW WALL FASTENER

CROSS-REFERENCE TO RELATED APPLICATION DATA

This application is a continuation-in-part of U.S. patent application Ser. No. 12/393,592, filed Feb. 26, 2009, which application claims the benefit of priority of U.S. Provisional patent application Ser. No. 61/033,115 filed Mar. 3, 2008.

BACKGROUND OF THE INVENTION

The present invention relates to mounting systems. More particularly, the present invention is directed to a fastener system for hollow walls and ceilings.

Most walls and ceilings of newer residential and commercial structures have a hollow cavity construction, that is, there is a hollow space behind the wall. A typical wall has a sheet of material, typically between 1 and 2.54 cm thick, affixed to a suitable frame such as wood or metal framing members, commonly referred to as studs (walls) or joists (ceilings). Forms of sheet material include drywall, wallboard, plasterboard, and gypsum board, sold under the trademark SHEET-ROCK®.

Various fasteners are available for attaching objects to a wall or ceiling (collectively referred to as wall) at a location other than over the area where a framing member is located. These fasteners can generally be divided into two general types—toggle fasteners and expansion fasteners. Toggle fasteners generally have two components, an anchor or first component has spreading or tilting arms and is inserted with the arms folded into a drilled hole in the wall material, and an activator or second component, typically a screw or pin, is used to cause the anchor's arms to tilt or spread within the hollow space behind the wall to lock the fastener in place on the wall.

Expansion fasteners are generally secured by an increase in their diameter. Some anchors are hammered into a wall or inserted into a pre-drilled hole. An activator such as a pin or screw is forced into a central, cylindrical cavity within the fastener, increasing its diameter. Still other fasteners have tangs which expand to resist pull-out of the fastener.

Toggle and expansion fasteners suffer from significant disadvantages. First, typically, these fastener systems do not have ready-made pins, or tools to insert the pins, to actuate the anchor portion of the fastener. Moreover, tools are required to insert pins and to actuate the anchors.

In addition, difficulty is often encountered in properly tightening the pin/anchor which results in over-torquing the fastener, failure of the wall, or other unacceptable condition. Furthermore, many of these fastening systems are non-removable or are difficult to remove from the wall without leaving a large, unsightly hole. And, expansion fasteners crush the friable drywall material which can limit the grip of the device in the wall.

One other anchor includes a flange that lies flush on the wall and gussets that extend from the flange to provide structural integrity to the flange. A leg section extends rearwardly from the flange and has a point for penetrating the wall. The leg is formed in two section—a fixed section and a rear hinged portion that pivots to engage the inner surface of the wall.

A pin has a head, such as an arrow head that is inserted into an oval opening in the anchor. When the pin is fully inserted into the anchor, it is rotated. The arrow head engages a tip on the rear end of the hinged leg to urge the hinged leg against the inside surface of the wall.

While this hinged anchor functions well in many situations, it is limited in the thickness of the wall into which it is installed. Moreover, it has been found that if the leg cannot rotate 90 degrees to "lock" against the wall inner surface, the shaft may twist and perhaps break as the pin is rotated. This is particularly troublesome in that the pin may not lock in place to lock the anchor. In addition, it has been found that once rotated, the pin often cannot be removed from the anchor. This type of anchor is disclosed in U.S. patent application Ser. No. 11/678,459, filed Feb. 23, 2007.

Accordingly, there is a need for an anchor system that is easily installed in hollow walls, that has pre-formed pins or the like for attaching objects to the wall. Such a system includes an anchor with a hinged leg that locks into place in the wall, with a pin that moves the leg, but that is readily removed from the wall. Desirably, the anchor of such an anchor system is forgiving in that the hinged leg can be at more than or less than 90 degrees and can nevertheless lock to the wall.

SUMMARY OF THE INVENTION

An anchor system for a hollow wall or ceiling includes an anchor portion having a flange and a penetrating portion extending from a rear surface of the flange. The penetration portion has a fixed sleeve extending from the rear surface of the flange and a pivoting locking leg connected to the fixed sleeve by a hinge.

The fixed sleeve has a non-round opening extending longitudinally therethrough. The pivoting locking leg has a stub extending from a rear surface thereof to retain the penetrating portion rigid as the anchor is inserted into the wall or ceiling.

A pin portion has a body including a flexible shaft. The pin has an actuating element extending transversely from the shaft. The shaft tapers, near the actuating element, toward the actuating element and defines a transverse dimension. The actuating element has a heel at about a rear surface thereof.

When the pin is inserted into the opening, the actuating portion contacts the stub to separate the pivoting locking leg from the fixed sleeve portion and pivot the pivoting locking leg portion toward an inner surface of the wall or ceiling. Rotating the pin engages the actuating element at the heel with the stub to lock the leg in place. The shaft flexes to accommodate rotation of the leg more than or less than 90 degrees to secure the leg against the inner surface.

In a present anchor, the opening has a D-shaped cross-section. The largest dimension of the opening, across a straight side of the D-shape, is greater than the transverse dimension of the actuating element and the dimension across a rounded side of the D-shape is greater than a dimension of the actuating element normal to the transverse dimension. Preferably, the hinge is disposed on a side with the straight leg of the D-shaped cross-section of the opening.

In the exemplary embodiment, the actuating element has an arrowhead shape, with the transverse dimension measured across the arrowhead. The stub and opening are sized so that the stub locks into the opening when the pivoting locking leg is aligned with the fixed sleeve as the penetrating portion is driven into the wall and to release the pivoting locking leg when the pin is inserted into the opening.

The pin can be formed with a flange, such that the shaft extends from one side of the flange and a functional element, such as a hook is formed on the other side of the flange.

The opening and pin are sized to allow the repeated insertion and removal of the pin into and from the opening and repeated rotation and reverse rotation of the pin in the opening.

An alternate pin portion has a body and includes a flexible shaft extending from the body. The pin portion has an actuating element extending transversely from the shaft. The pin portion including an opening in the body, spaced from the flexible shaft.

After the pin portion is inserted into the sleeve opening and properly oriented, a secondary locking pin is inserted through the pin portion body opening into the hollow wall or ceiling to prevent rotation of the pin portion relative to the anchor portion.

These and other features and advantages of the present invention will be readily apparent from the following detailed description, in conjunction with the claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 1A-1C are side, top and perspective views of a pin portion of a known hollow wall anchor system;

FIG. 2 is a side sectional view illustrating the anchor portion of the known system inserted into a wall and showing the direction of movement of the pin into the anchor portion;

DETAILED DESCRIPTION OF THE INVENTION

Figure 3:
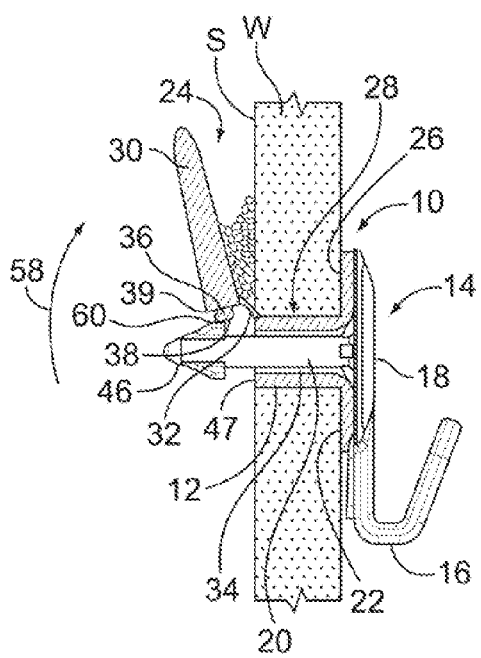
FIG. 3 is a side sectional view illustrating an anchor system in accordance with the present invention, the pin being inserted into the anchor portion and rotated into the locking position.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

FIGS. 1A through 1C show side, top and perspective views of the pin portion 102 of the anchor system 101 of U.S. Ser. No. 11/678,459, referred to above. FIG. 2 illustrates the insertion of the pin portion 102 into an anchor 103. The pin portion includes a plate 104 with a shaft 105 extending rearwardly from the plate 104. A pair of feet 106 extend outwardly from about an end 115 of the shaft 105 forming an arrow-head shape as indicated at 107.

The anchor 103 includes a flange or face 108, a penetrating portion 109 having a front section 110 fixed to the flange 108 and a rear section 111 connected to the front section 110 by a flexible hinge portion 112. An oval opening 113 extends through the front section 110 of the penetrating portion 109. The rear section 111 includes a projection 114 that engages the front section opening 113 during the driving stage. When the pin 102 is inserted into the opening 113, it contacts the projection 114 and pivots the rear section 111 into a locked condition.

In the embodiment of FIGS. 1A-C and FIG. 2, the opening 113 in the anchor is oval. The major axis $A_{113\ maj}$ is slightly smaller than the large dimension or height $h_{107}$, across the arrow head 107. The minor axis $A_{113\ min}$ is slightly larger than the small dimension or width $w_{107}$, across the arrow head 107. Accordingly, when the pin 102 is inserted into the anchor 103 and rotated 90 degrees, the arrow-head 107 is intended to engage the rear section 111 and as such, the rear section 111 pivots or bends (along the hinge 112) and the pin 102 is locked into place in the anchor 103. If there is any obstruction behind the rear section or leg 111, the arrow-head 107 cannot exert sufficient force to lock the leg 111 in the bent orientation.

In addition, the pin shaft 105 from the plate 104 out to the feet 106 of the arrowhead 107 has a substantially constant cross-section. It has been found that even when the pin 102 is rotated back 90 degrees, because of the differences between the dimensions $h_{107}/w_{107}$ across the arrowhead 107 and the shaft diameter $d_{105}$ relative to the minor dimension $A_{113\ min}$ of the opening 113, the pin 102 cannot be removed from the anchor 103. Further, it has been found that the rear section 111 of the anchor 103 may not lock into place if the rear section 111 is pivoted more or less than 90 degrees (up against the inside surface S of the wall).

Figure 4A:
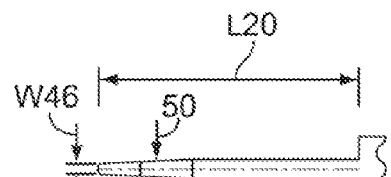
FIGS. 4A and 4B are top and side views, respectively, of the shaft and arrowhead of the pin portion of the present anchoring system.

The present anchor system 10, is seen in FIGS. 3 and 4A,B, and includes an anchor portion 12 and a pin 14. The pin is illustrated with a hook 16 on the face 18 of the pin, opposite the shaft 20. It will be appreciated that elements other than a hook 16 can be formed on or attached to the face of the pin 18.

The anchor 12 includes a flange 22 having a penetrating portion 24 extending from a rear surface 26 of the flange 22. The penetrating portion 24 includes a fixed sleeve 28 (fixed relative to the flange 22) and a pivoting locking leg 30 that is connected to the fixed sleeve 28 by a hinge 32. The sleeve 28 (as the name suggests), includes a longitudinally formed opening 34 therein. The locking leg 30 includes a projection 36 having a knob or stub 38 at the end 39 that fits into the opening 34 in the fixed sleeve 28. The stub 38 locks into the sleeve 28 so that the penetrating portion 24 remains rigid as it is driven into a wall W.

Figure 5:
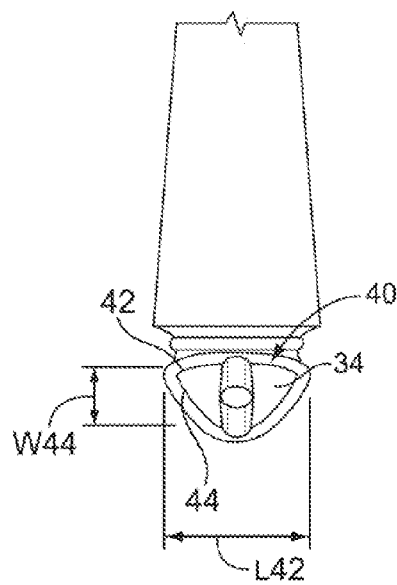
FIG. 5 is a view of the rear of the anchoring system shown with the pin in place and the locking leg rotated up, to better view the sleeve opening in the anchor portion.
Figures 6A, 6B:
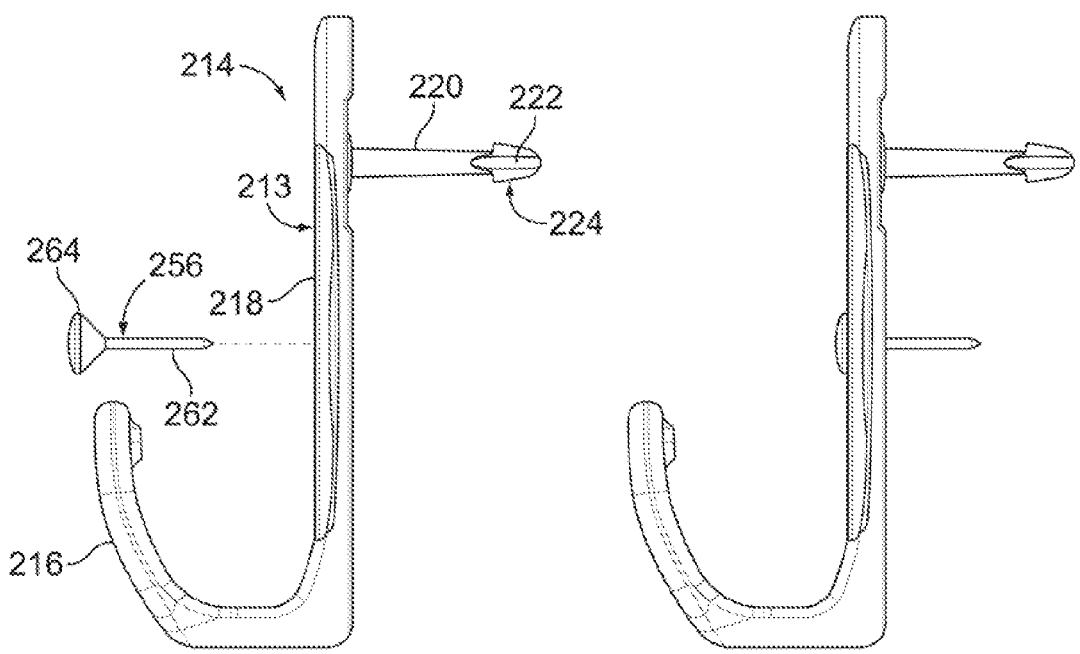
FIGS. 6A and 6B are side views of an alternate pin portion for a hollow wall anchoring system, the pin portion having a secondary positional locking pin, FIG. 6A showing the secondary pin in an exploded perspective and FIG. 6B showing the pin inserted into the pin portion.
Figure 7:
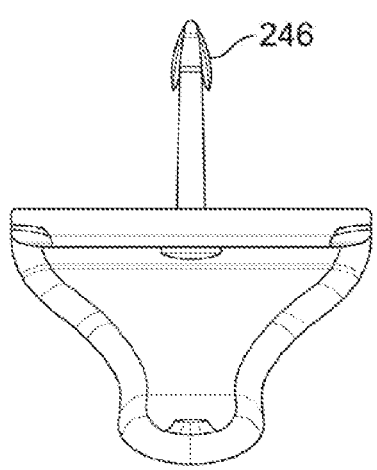
FIG. 7 is a top view of the alternate pin portion of FIGS. 6A and 6B.
Figure 8A:
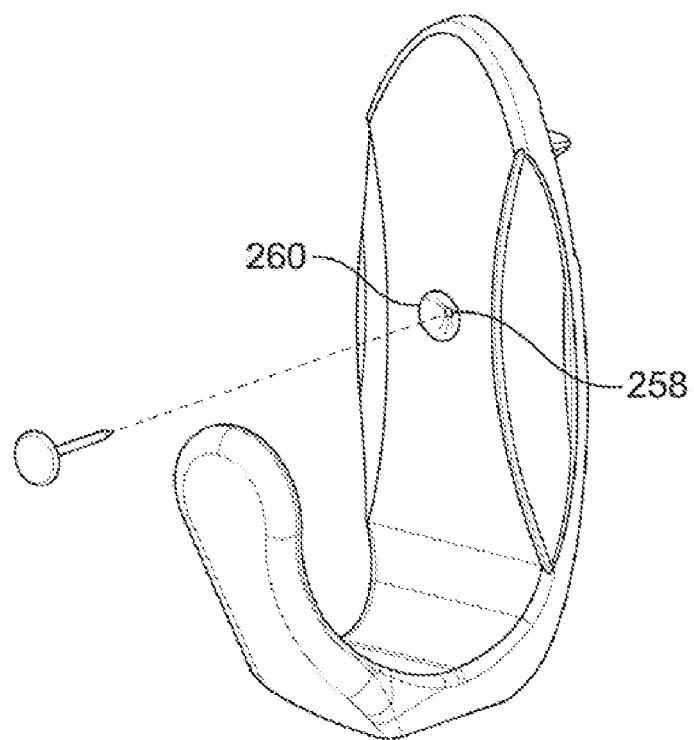
FIG. 8A is a front perspective view of the pin portion of FIGS. 6A and 6B with the locking pin in exploded perspective.
Figure 8B:
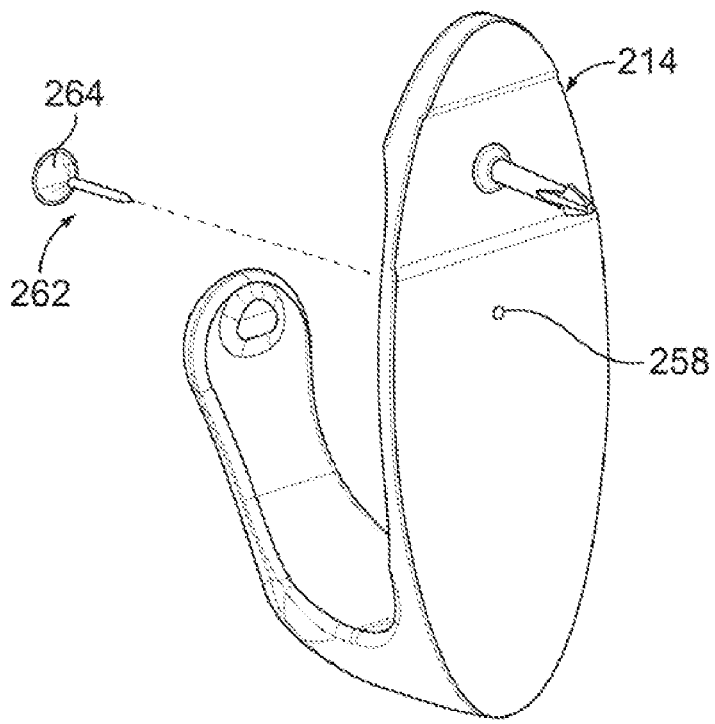
FIG. 8B is a rear view of the illustration of FIG. 8A.
Figure 9:
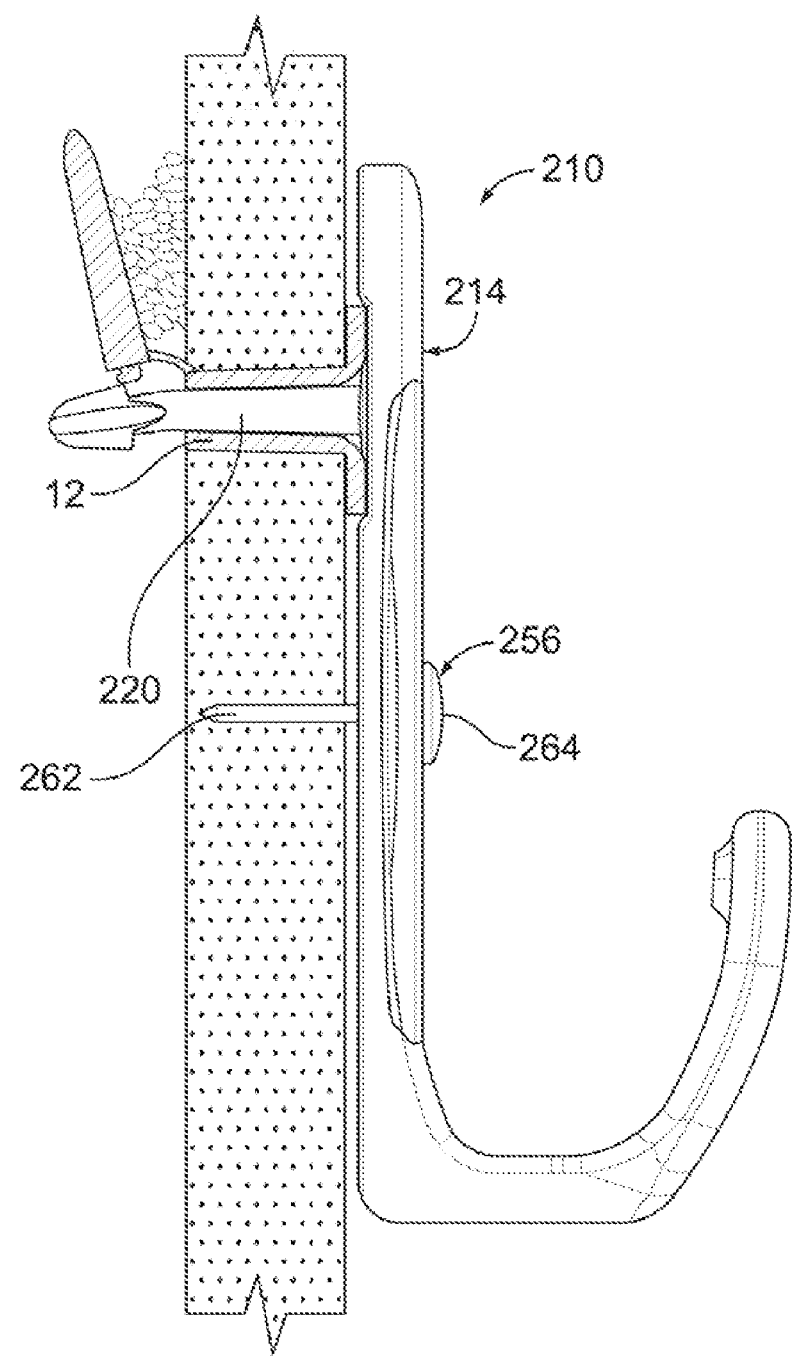
FIG. 9 is a side view of the alternate embodiment of the hollow wall anchor in place in a wall with the secondary pin portion inserted into the wall to lock the pin portion in orientation.

As seen in FIG. 5, the opening 34 in the sleeve 28 is preferably non-round, and more preferably has a D-shape, as indicated at 40, with the straight leg 42 of the D along the same side as the hinge 32, and the rounded portion 44 of the D away from the hinge 32, toward a free side 47 of the sleeve 28. The largest dimension of the D, that is the length $L_{42}$ of the straight leg 42 is greater than the maximum dimension or height $h_{46}$ of the arrowhead 46. The dimension $w_{44}$ across the middle of the D (indicated at 44, transverse to and intermediate the ends of the straight leg 42) is larger than the width dimension $w_{46}$ of the arrowhead 46.

As can be seen in FIGS. 4A,B, the shaft 20 of the pin 14 tapers, as indicated at 50, into the width dimension $w_{46}$ of the arrowhead 46 such that the shaft 20 has a diameter $d_{20}$ that is about equal to the width dimension $w_{46}$ of the arrowhead 46. The shaft 20 diameter, however, in the foot 52 direction (as indicated at 54) does not taper. Rather, it remains substantially constant along the length $L_{20}$ of the shaft 20. It will thus be appreciated that the cross-section of the shaft 20 changes in size and shape along the length $L_{20}$ of the shaft 20 from the face 18 to the arrowhead 46 from essentially a circular cross-section (at the face 18) to an oval cross-section at the arrowhead 46.

With the pin 14 fully inserted into the opening 34 and then rotated, the arrowhead 46 rests such that the stub 38 is resting behind the foot 52 (se FIG. 3), rather than on the foot. As the arrowhead 46 passes the stub 38, the act of inserting the pin 14, provides sufficient force on the leg 30 to rotate the leg 30 (as indicated by the arrow at 58). It has been found that this configuration not only maintains the leg 30 locked against the inside surface S of the wall W, but also (by rotating the pin 14 ninety (90) degrees) locks the pin 14 in the anchor 12 (by engagement of the barb end 60 of the foot 52 against the stub 38). It also allows the pin 14 to be readily removed from the anchor 12. The opening 34 and pin 14 are sized to allow the repeated insertion and removal of the pin 14 into and from the opening 34 and repeated rotation and reverse rotation of the pin 14 in the opening 34.

Importantly, as seen in FIG. 3, this arrangement also allows for some "forgiveness" in that the leg 30 can be over- or under-rotated from 90 degrees, lock into the anchor 12, and still maintain the leg 30 fully engaged with the wall, and the anchor 12 securely in place. Because the arrowhead 46 locks behind the stub 38, the leg 30 and pin 14 are locked into place. The flexible shaft 20 allows for the leg 30 to flex or bend (as shown in FIG. 3, the leg 30 is flexing downward) to, for example, accommodate drywall debris, dust, paper, etc., between the leg 30 and wall surface S, and still lock into place. Again, this arrangement also allows for the pin 14 to be readily removed from the anchor 12 by rotating the pin 90 degrees to align the arrowhead 46 with the opening 34 (with the arrowhead 46 parallel to the opening straight leg 42) and withdrawing the pin 14.

FIGS. 6-9 illustrate an alternate embodiment of the pin portion 214 of the hollow wall fastener assembly 210. It is to be understood that this embodiment 214 can be used with the previously described anchor 12, or with any know anchor into which the pin portion 214 can be inserted and used. The pin portion 214 includes a plate 213 with a shaft 220 extending rearwardly from the plate 213. In one embodiment, a pair of feet 222 extend outwardly from about an end 224 of the shaft 220 forming an arrow-head shape as indicated at 246.

The pin portion 214 is illustrated with a hook 216 on the face 218 of the pin 214, opposite the shaft 220. It will be appreciated that elements other than a hook 216, such as a stub, or ring or other hanging element can be provided or formed on or attached to the face 218 of the pin 214.

Figure 4B:
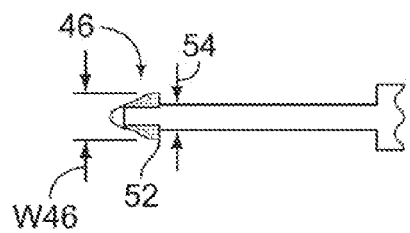

Briefly, as illustrated in FIGS. 4A-4B, the shaft of the pin can taper into the width dimension of the arrowhead such that the shaft has a diameter that is about equal to the width dimension of the arrowhead. The shaft diameter, however, in the foot direction may be configured without a taper. Rather, it can remain substantially constant along the length of the shaft. It will thus be appreciated that, in the illustrated embodiment, the cross-section of the shaft changes in size and shape along the length of the shaft from the face to the arrowhead from essentially a circular cross-section (at the face 218) to an oval cross-section at the arrowhead.

Referring again to FIGS. 6-9, a secondary locking pin 256 is provided with the pin portion 214. The secondary locking pin 256 is used to secure the pin portion 214 in a desired orientation when the pin portion 214 is inserted in and locked to the anchor 12. In a present embodiment, the pin portion plate 213 includes an opening 258 with a countersunk or recessed region 260. The secondary locking pin 256 includes a pin 262, preferably a straight pin and a head portion 264. The head portion 264 is configured for positioning in the countersunk region 260 once the pin portion 214 is installed in the anchor 12. As such, the pin 256 can be configured with a conical head 264 portion, as illustrated, to fit into or complement the countersunk region 260 in the pin portion plate 213.

In a present embodiment, the opening 258 in the plate 213 for the secondary locking pin 256 is located below the shaft 220 when the pin portion 214 is installed in a proper orientation. It will, however, be appreciated that the opening 258 can be at any suitable location on the plate 213, so long as it is spaced from the shaft 220 extending from the rear of the plate 213. The spaced shaft 220 and secondary pin 256 provide a two-point configuration for maintaining the pin portion 214 orientation fixed and prevents the pin portion 214 from inadvertently rotating in the anchor 12.

The cooperation of the countersunk region 260/conical head portion 264 permit properly aligning the secondary pin 256 in the opening 258 and also allows the secondary pin 256 to lie flush or substantially flush on the plate 213. It may be desirable to have the head portion 264 extend slightly above the plate 213 to allow for ease of removal of the pin 256, but to be substantially fully inserted into the plate 213 to prevent the pin from inadvertently fall out of or being removed from the plate 213.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An anchor system for a hollow wall or ceiling comprising:
    an anchor portion having a flange and a penetrating portion extending from a rear surface of the flange, the penetrating portion having a fixed sleeve extending from the rear surface of the flange and a pivoting locking leg connected to the fixed sleeve by a hinge, the fixed sleeve having a sleeve opening extending longitudinally therethrough, the pivoting locking leg having a stub extending from a rear surface thereof to retain the penetrating portion rigid as the anchor is inserted into the wall or ceiling; and
    a pin portion having a body and including a flexible shaft extending from the body, the pin portion having an actuating element extending transversely from the shaft, the pin portion further including an opening in the body, spaced from the flexible shaft; and a secondary locking pin,
wherein when the pin portion is inserted into the sleeve opening, the actuating portion contacts the stub to separate the pivoting locking leg from the fixed sleeve portion and to pivot the pivoting locking leg portion toward an inner surface of the wall or ceiling, and wherein rotating the pin engages the actuating element at the heel with the stub to lock the leg in place, the shaft flexing to accommodate rotation of the leg more than or less than 90 degrees to secure the leg against the inner surface, and
wherein the secondary locking pin is inserted through the pin portion body opening into the hollow wall or ceiling to prevent rotation of the pin portion relative to the anchor portion.

2. The anchor system in accordance with claim 1 wherein the pin portion body opening has a countersunk profile.

3. The anchor system in accordance with claim 2 wherein the secondary locking pin has a head and a pin extending from the head, and wherein the head has a conical profile to complement the body opening profile.

4. The anchor system in accordance with claim 1 wherein the opening in the pin portion body is aligned along a longitudinal axis with the flexible shaft.

5. The anchor system in accordance with claim 1 wherein the flexible shaft extends from a rear surface of the body and including a mounting element extending from other than the rear surface of the body for mounting an object to the pin portion.

6. The anchor system in accordance with claim 5 wherein the mounting element is a hook.

7. The anchor system in accordance with claim 5 wherein the opening in the pin portion body is positioned between the mounting element and the flexible shaft.

8. The anchor system in accordance with claim 3 wherein the locking pin head is substantially flush with a front surface of the pin portion body.

* * * * *